United States Patent
Hukan

(10) Patent No.: US 11,799,123 B2
(45) Date of Patent: Oct. 24, 2023

(54) RECHARGEABLE BATTERY PACK APPARATUS AND METHOD FOR OPERATING THE RECHARGEABLE BATTERY PACK APPARATUS

(71) Applicant: Hilti Aktiengesellschaft, Schaan (LI)

(72) Inventor: Mohammad Hukan, Stuttgart (DE)

(73) Assignee: Hilti Aktiengesellschaft, Schaan (LI)

( * ) Notice: Subject to any disclaimer, the term of this patent is extended or adjusted under 35 U.S.C. 154(b) by 165 days.

(21) Appl. No.: 17/297,621

(22) PCT Filed: Nov. 22, 2019

(86) PCT No.: PCT/EP2019/082200
§ 371 (c)(1),
(2) Date: May 27, 2021

(87) PCT Pub. No.: WO2020/114800
PCT Pub. Date: Jun. 11, 2020

(65) Prior Publication Data
US 2022/0029190 A1    Jan. 27, 2022

(30) Foreign Application Priority Data
Dec. 5, 2018 (EP) .................................... 18210391

(51) Int. Cl.
*H01M 10/04* (2006.01)
*H01M 10/48* (2006.01)
(Continued)

(52) U.S. Cl.
CPC ....... *H01M 10/0481* (2013.01); *H01M 10/48* (2013.01); *H01M 10/482* (2013.01);
(Continued)

(58) Field of Classification Search
None
See application file for complete search history.

(56) References Cited

U.S. PATENT DOCUMENTS 7,826,189 B1 * 11/2010 Edwards ............... H01M 10/48
320/135
9,509,020 B1 * 11/2016 Wang ................... H01M 50/204
(Continued)

FOREIGN PATENT DOCUMENTS

| CN | 102479985 A | 5/2012 |
| CN | 102646856 A | 8/2012 |

(Continued)

OTHER PUBLICATIONS https://www.interlinkelectronics.com/force-sensing-resistor (Year: 2022).*
(Continued)

*Primary Examiner* — Lisa S Park
(74) *Attorney, Agent, or Firm* — Davidson, Davidson & Kappel, LLC

(57) ABSTRACT

A rechargeable battery pack apparatus (1) for an electric handheld power tool, including a housing device (10) and a rechargeable battery pack (20) which has at least one pouch cell (21, 22, 23, 24) is. In this case, a detecting device (50) having a detecting element (52), which is coupled to the rechargeable battery pack (20), and a sensor (51), which is arranged fixed to the housing, are provided, wherein the sensor (51) is designed for detecting the detecting element (52) when a distance between the detecting element (52) and the sensor (51) is below a defined distance. A method for operating a rechargeable battery pack apparatus (1) of this kind is also described.

15 Claims, 2 Drawing Sheets

(51) Int. Cl.
*H01M 10/647* (2014.01)
*H01M 50/211* (2021.01)
*H01M 50/247* (2021.01)
*H01M 50/578* (2021.01)

(52) U.S. Cl.
CPC ....... *H01M 50/211* (2021.01); *H01M 50/247* (2021.01); *H01M 50/578* (2021.01); *H01M 2200/103* (2013.01); *H01M 2200/20* (2013.01)

(56) References Cited

U.S. PATENT DOCUMENTS

| | | | |
|---|---|---|---|
| 2012/0126991 A1* | 5/2012 | Cassidy | H01M 10/425 324/435 |
| 2012/0208054 A1 | 8/2012 | Shirasawa et al. | |
| 2013/0337297 A1 | 12/2013 | Lee et al. | |
| 2015/0044528 A1* | 2/2015 | Yang | H01M 50/578 429/61 |
| 2015/0055387 A1 | 2/2015 | Tengner et al. | |
| 2015/0162593 A1 | 6/2015 | Lee et al. | |
| 2015/0207131 A1 | 7/2015 | Han | |
| 2016/0149270 A1* | 5/2016 | Albert | H01M 10/488 429/50 |
| 2018/0159185 A1 | 6/2018 | Choi et al. | |

FOREIGN PATENT DOCUMENTS

| | | | |
|---|---|---|---|
| CN | 202585672 U | | 12/2012 |
| CN | 103493255 A | | 1/2014 |
| CN | 104303358 A | | 1/2015 |
| CN | 104303385 A | | 1/2015 |
| CN | 206789648 U | | 12/2017 |
| EP | 2284929 A1 | | 2/2011 |
| EP | 2860796 A2 | | 4/2015 |
| JP | S569972 | * | 1/1981 |
| KR | 20150073392 | * | 7/2015 |

OTHER PUBLICATIONS

International Search Report of PCT/EP2019/082200, dated Jul. 1, 2020.

* cited by examiner ic
RECHARGEABLE BATTERY PACK APPARATUS AND METHOD FOR OPERATING THE RECHARGEABLE BATTERY PACK APPARATUS The present invention relates to a rechargeable battery pack apparatus comprising a housing device and a rechargeable battery pack—which has at least one pouch cell, and to a method for operating a rechargeable battery pack apparatus.

BACKGROUND

Rechargeable battery packs, which are designed with one or more pouch cells, are known in principle from the prior art. Gas formation can occur during operation of lithium ion-based pouch cells or of the rechargeable battery pack, for example as part of an aging process of pouch cells. These gases can be produced, for example, in the event of electrolyte decomposition or on account of loading of the pouch cells, for example in the event of overloading or overheating. Owing to these gases, a pressure builds up within an outer casing of the pouch cells and a volume of the pouch cell increases. If the pressure reaches or exceeds a critical pressure level, the outer casing of the pouch cell can be damaged and burst as a result. The risk of a fire occurring is also greatly increased as a result.

In contrast to conventional cylindrical cells which are designed with a current interruption device which isolate electrodes of the cell when a defined internal pressure in the cell is exceeded, known pouch cells do not have a current interruption device of this kind. Since an outer casing of the pouch cell is designed as a film and therefore does not exhibit a high degree of robustness, an internal pressure in the pouch cell, which internal pressure is increased by so-called swelling, can lead to the outer shell bursting, this being accompanied by gas escaping.

SUMMARY OF THE INVENTION

It is an object of the present invention to provide a rechargeable battery pack apparatus and a method for operating a rechargeable battery pack apparatus, wherein the rechargeable battery pack apparatus can be operated in a safe manner.

The present invention provides a rechargeable battery pack apparatus comprising a housing device and a rechargeable battery pack which has at least one pouch cell in that a detecting device having a detecting element, which is coupled to the rechargeable battery pack or at least one pouch cell, and a sensor, which is arranged fixed to the housing, are provided, wherein the sensor is designed for detecting the detecting element when a distance between the detecting element and the sensor is below a defined distance.

A rechargeable battery pack apparatus which is designed according to the invention can be operated in a safe manner since an increase in the size of at least one pouch cell of the rechargeable battery pack to greater than a defined circumference can be detected by means of the detecting device and thereto An increase in an internal pressure within an outer casing of a pouch cell, for example due to overloading, a short circuit or as a consequence of aging, leads to expansion of the pouch cell. Owing to this expansion, the pouch cell increases in size in a main direction which is arranged, in particular, substantially transversely in relation to a main direction of extent of the pouch cell. This process, which is referred to as swelling, can result in damage to or uncontrolled bursting of an outer casing of the pouch cell. This creates an increased safety risk for the user since electrolyte can escape from the outer casing of the pouch cell as a result and can catch fire as a result of contact with an ignition source, for example a cell connector which is at a high temperature. In addition, the damage to the outer casing of the pouch cell can render live regions of the pouch cell freely accessible. After bursting, the pouch cell continues to function, and therefore thermal runaway can occur. These disadvantages are prevented in a simple manner by a rechargeable battery pack apparatus which is designed according to the invention.

The detecting element is coupled to the rechargeable battery pack or to a pouch cell of the rechargeable battery pack, in particular, in such a way that the detecting element is displaced in the direction of the sensor and as a result a distance between the detecting element and the sensor is reduced when the at least one pouch cell increases in size in the main direction, so that an increase in size of this kind of one and/or more pouch cells of the rechargeable battery pack can be detected by the sensor.

In this case, the detecting element can be a separate component, which is directly or indirectly connected to the rechargeable battery pack or a pouch cell of the rechargeable battery pack, or can be formed, for example, directly by a pouch cell of the rechargeable battery pack or by the rechargeable battery pack.

A rechargeable battery pack which is designed, in particular, with lithium-ion pouch cells is high-performing and can be configured in a lightweight and compact manner at the same time. On account of their internal design, pouch cells exert a considerably lower internal resistance than conventional cylindrical battery cells, as a result of which higher discharge currents can be realized without the rechargeable battery pack overheating. At the same time, lithium-ion pouch cells can be produced with flexible geometries, as a result of which the rechargeable battery pack can be constructed in a lightweight and compact manner.

In a preferred embodiment of the rechargeable battery pack apparatus, the detecting device is arranged on a plate-like element which bears against the rechargeable battery pack and can be displaced in relation to the housing device and, with a wall of the housing device, delimits a space which has the at least one pouch cell. The plate-like element bears against the at least one pouch cell, in particular, in the main direction, so that, when the at least one pouch cell increases in size in the main direction, the plate-like element is displaced in the main direction in relation to the wall of the housing device and is moved toward the sensor which is arranged on another wall of the housing device.

In an alternative embodiment, the detecting element can also be directly connected to the rechargeable battery pack, for example to a pouch cell of the rechargeable battery pack. In an embodiment of this kind too, an increase in size of the at least one pouch cell in the main direction leads to displacement of the detecting element in the direction of the sensor, so that a distance between the detecting element and the sensor is reduced.

In order to reliably detect a critical increase in size of the at least one pouch cell, the sensor can be designed for detecting the detecting element in a contact-based manner. In this case, the sensor detects the detecting element when it comes into contact with the sensor and a distance between the detecting element and the sensor is equal to zero. As an alternative to this, provision can also be made for the sensor to be designed for detecting the detecting element in a contact-free manner and to detect the detecting element when the distance between the detecting element and the sensor is smaller than a prespecified threshold value. The sensor is designed, in particular, for immediately and/or reversibly detecting the detecting element.

For the purpose of detecting the detecting element in a simple and reliable manner, the sensor can be formed with a material which changes resistance when the detecting element makes contact with it. Provision can be made here for a change in resistance to be ascertained directly or by means of a voltage divider.

In a structurally simple embodiment, the sensor is arranged on a further wall of the housing device and, in particular, at least in regions in a recess of the further wall of the housing device. Owing to the arrangement of the sensor in the recess, the probability of unintentional detection or unintentional contact occurring is reduced.

In order to reliably prevent undesired detection of the detecting element by the sensor in a structurally simple manner, which detection is due to external actions of force and is not based on an increase in size of the at least one pouch cell, at least one spring device can be provided, which spring device directly or indirectly applies a force to the detecting element, which force pushes the detecting element in a direction which faces away from the sensor. In this case, the at least one spring device is arranged, in particular, between the plate-like element and the further wall of the housing device. In this case, a spring strength of the at least one spring device is selected in such a way that the detecting element is displaced in the direction of the sensor to a desired extent when the at least one pouch cell increases in size in the main direction. The provision of the at least one spring device further has the advantage that a performance of the at least one pouch cell is improved by the application of pressure to the pouch cells.

In a preferred embodiment, a plurality of spring devices are provided, which spring devices are arranged, in particular, in such a way that an introduction of force which is as uniform as possible is achieved. By way of example, four spring devices are provided, each one of which spring devices is associated with one corner region of a plate-like element which is of substantially rectangular design.

In this case, at least one spring device can be designed as a helical spring or as a plate spring, wherein an arrangement which is expedient in respect of installation space is rendered possible, in particular, by means of at least one plate spring.

In a preferred embodiment, the at least one pouch cell is preferably arranged at least in regions within a space which is delimited by the housing device. In this case, the housing device can be of highly flexible design and can delimit, for example, a space which contains the rechargeable battery pack from at least three sides. In this case, the housing device can be of open design in at least one direction, preferably a direction which differs from the main direction, so that, for example, arrangement of the rechargeable battery pack in the housing device is simplified.

A control device can be provided for the purpose of, in particular, active deactivation of the rechargeable battery pack apparatus when the detecting element is detected by the sensor, by means of which control device the rechargeable battery pack can be actuated, wherein the detecting device is operatively connected to the control device. This can ensure, in a simple manner, that further operation of the rechargeable battery pack is suppressed by the control device in the event of the detecting element being detected by the sensor.

In order to reliably prevent further operation of the rechargeable battery pack when the sensor detects the detecting element, a disconnection device can be provided in a preferred embodiment, which disconnection device is part of an electrical circuit which actuates the rechargeable battery pack, wherein the disconnection device is designed for mechanically interrupting the electrical circuit when the detecting element is detected by the sensor. An, in particular, passively acting disconnection device can have, for example, a protection element in the form of a fuse or a fusible link which isolates the electrical circuit in which the rechargeable battery pack is incorporated when the defined increase in size of the at least one pouch cell is detected, and reliably prevents further operation of the rechargeable battery pack. To this end, the sensor can be connected, for example, to a so-called FET or MOSFET which operates a heating element of the fusible link when the detecting element is detected, so that the fuse trips.

The invention further proposes a method for operating a rechargeable battery pack apparatus of this kind, wherein a housing device and a rechargeable battery pack, which has at least one pouch cell, is provided, wherein a detecting device having a detecting element, which is coupled to the rechargeable battery pack, and a sensor, which is arranged fixed to the housing, are provided, and wherein the sensor is designed for detecting the detecting element when a defined distance between the detecting element and the sensor is undershot. In this case, it is proposed that operation of the rechargeable battery pack is prevented when a distance between the detecting element and the sensor is smaller than the defined distance over a defined period of time.

As a result, more reliable operation of a rechargeable battery pack apparatus is achieved since detection of the detecting element by the sensor, which detection is caused by an increase in size of at least one pouch cell, is reliably ascertained by means of the detecting device and further operation of the rechargeable battery pack when at least one pouch cell increases in size, along with the risk of damage to the rechargeable battery pack and the occurrence of fire, is prevented. Detection of the detecting element by the sensor, which is attributed to an external action of force for example, is reliably prevented since detection of this kind is usually only briefly present and, owing to a corresponding selection of the period of time, does not lead to deactivation of the rechargeable battery pack.

Further advantages can be found in the description of the figures that follows. An exemplary embodiment of the present invention is depicted in the figures. The figures, the description and the claims contain numerous features in combination. A person skilled in the art will expediently also consider the features individually and combine them to produce further useful combinations.

BRIEF DESCRIPTION OF THE DRAWINGS

In the figures, identical and similar components are denoted by identical reference signs. In the figures.

DETAILED DESCRIPTION

Figure 1:
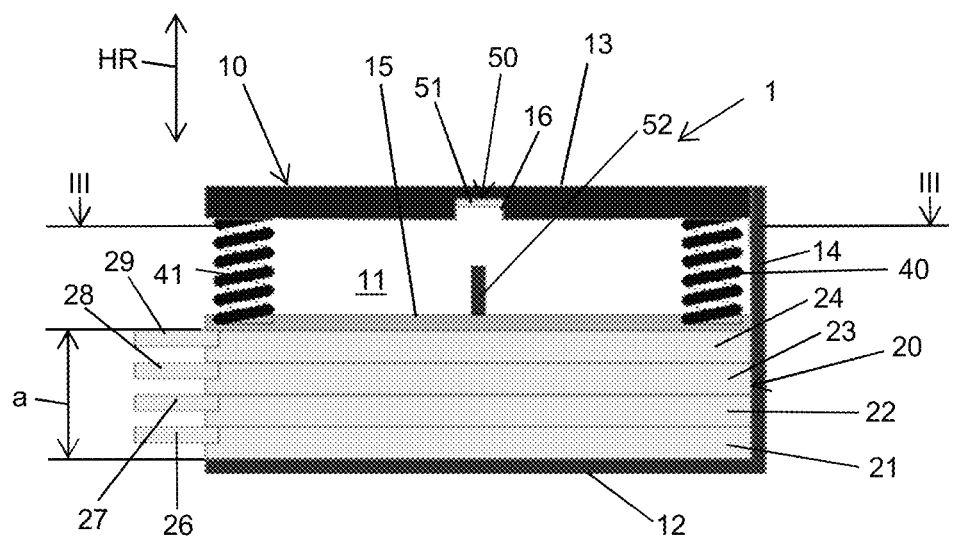
FIG. 1 shows a simplified exemplary embodiment of a rechargeable battery pack apparatus comprising a rechargeable battery pack which has a plurality of pouch cells and is arranged in a housing device.
Figure 2:
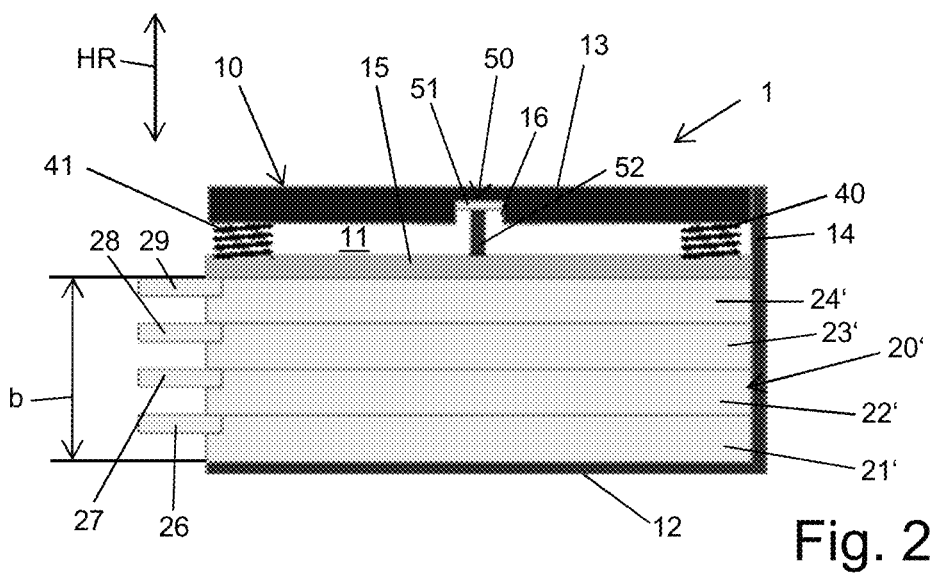
FIG. 2 shows a simplified illustration of the rechargeable battery pack apparatus according to FIG. 1, wherein the pouch cells are increased in size in a main direction.
Figure 3:
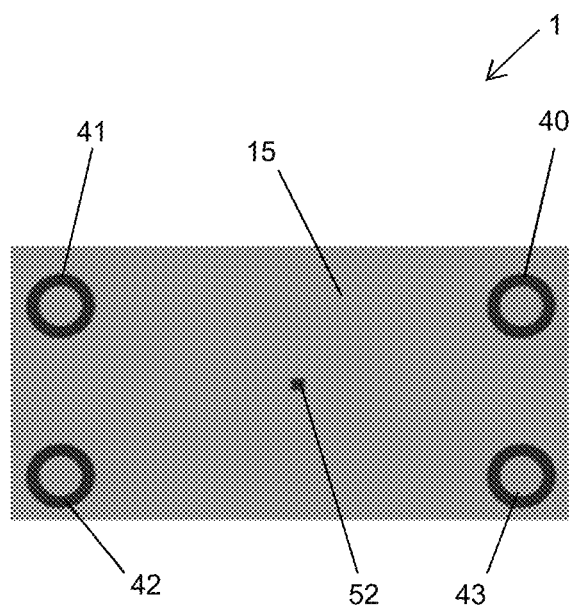
FIG. 3 shows a simplified sectional illustration through the rechargeable battery pack apparatus according to FIG. 1 along line III-III.

FIGS. 1 to 3 show a rechargeable battery pack apparatus 1 for an electrical handheld power tool, which rechargeable battery pack apparatus has a housing device 10 and a rechargeable battery pack 20. In the exemplary embodiment depicted in the present case, the rechargeable battery pack 20 has four pouch cells 21, 22, 23, 24 of identical design, wherein fewer, for example two or three, or more than four pouch cells can also be provided in alternative embodiments. The pouch cells 21, 22, 23, 24 are at least partially, in the present case almost completely, arranged in a stacked manner in an interior space 11 which is formed by the housing device 10.

In FIG. 1, the pouch cells 21, 22, 23, 24 are depicted in the new state, that is to say in the non-expanded state. FIG. 2 shows, in turn, the rechargeable battery pack 20 with aged, expanded cells 21', 22', 23', 24'. As can be gathered by looking at FIG. 1 and FIG. 2 together, a stack height a in the new rechargeable battery pack 20 is lower than a stack height b of the aged rechargeable battery pack 20' in FIG. 2. The pouch cells 21 to 24 are designed, in particular, as lithium-polymer cells and are electrically contact-connected to one another by means of contact lugs 26, 27, 28, 29.

Gas formation can occur within the pouch cells 21, 22, 23, 24 during operation of the pouch cells 21, 22, 23, 24 as part of an aging process. These gases can be produced, for example, in the event of electrolyte decomposition or on account of loading of the pouch cells 21, 22, 23, 24, in particular in the event of overloading, a short circuit or overheating. Owing to these gases, a pressure builds up within an outer casing of the pouch cells 21, 22, 23, 24, so that a volume within the outer casing of the pouch cells 21, 22, 23, 24 increases. This is also referred to as swelling. As a result, the pouch cells 21, 22, 23, 24 increase in size, in particular, in a main direction HR. If the pouch cells 21', 22', 23', 24' which are increased in size continue to be operated, the pressure within the outer casing of the respective pouch cell 21', 22', 23', 24' can reach or exceed a critical pressure level, so that the outer casing of the pouch cell 21', 22', 23', 24' becomes damaged and/or can burst in an uncontrolled manner as a result. In this case, electrolyte escaping from the outer casing can come into contact with an ignition source, for example a hot cell connector, and catch fire as a result. After bursting, pouch cells 21, 22, 23, 24 continue to function, and therefore thermal runaway can occur. The described solution can reliably prevent the pouch cells 21, 22, 23, 24 from being damaged during operation and prevent the abovementioned disadvantages from occurring.

In the present case, the housing device 10 has at least one wall 12 and one further wall 13 which is situated opposite the wall 12 and is arranged, in particular, substantially parallel in relation to the wall 12, said walls being fixedly connected to one another by an additionally wall 14 which is arranged substantially perpendicularly in relation to the walls 12, 13. The rechargeable battery pack 20 and, in the present case, the pouch cell 21 here bear directly and, in particular, flat against the wall 12. In alternative embodiments of the invention, the interior space 11 can be delimited by further walls which are arranged, in particular, perpendicularly in relation to all walls 12, 13, 14. In addition, provision can also be made for the individual walls 12, 13, 14 to have one or more recesses.

Furthermore, a plate-like element 15 which is arranged substantially parallel in relation to the walls 12 and 13 is provided. In the present case, the plate-like element 15 likewise bears against the rechargeable battery pack 20, here in particular flat against the pouch cell 24, so that the rechargeable battery pack 20 is held by the wall 12 and the plate-like element 15 in the main direction HR and as a result a stack height a and, respectively, b of the rechargeable battery pack 20 and, respectively, 20' is defined.

The plate-like element 15 can be displaced relative to the walls 12 and 13 of the housing device 10. Provision can be made here for the plate-like element 15 to be freely movable in relation to the walls 12, 13 or for a guide device for targeted displacement of the plate-like element 15 to be provided.

In order to ensure that the rechargeable battery pack 20 is arranged in a bearing manner between the plate-like element 15 and the wall 12 in the main direction HR in each case both in the basic state and, respectively, the new state of the pouch cells 21, 22, 23, 24 according to FIG. 1 and also in the aged, expanded state of the pouch cells 21', 22', 23', 24' according to FIG. 2, four spring devices 40, 41, 42, 43 which are designed as helical springs are provided in the present case, which spring devices are arranged between the further wall 13 and the plate-like element 15 in the main direction HR and apply a force, which presses the plate-like element 15 in the direction of the wall 12, to the plate-like element 15. In order to achieve uniform application of force to the plate-like element 15 by the spring devices 40, 41, 42, 43, each spring device 40, 41, 42, 43 is arranged in one corner region of the plate-like element 15, which is of substantially rectangular design here, in the present case, as shown in more detail in FIG. 3.

A number and arrangement of the spring devices can be varied as desired in principle and is selected, in particular, in such a way that an application of force to the plate-like element 15 which is as uniform as possible for the respective use is achieved. As an alternative to the provision of helical springs, other types of springs, for example at least one plate spring, can also be provided in alternative embodiments. Furthermore, provision can be made for the plate-like element to be of multipartite design with a plurality of small elements which each serve, in particular, as a support point for a spring device 40, 41, 42, 43 and can each be displaced in relation to the housing device 10. In this case, the elements of the plate-like element are, in particular, arranged in such a way and interact with spring devices in such a way that a pressure which is exerted on the pouch cells 21, 22, 23, 24 by the spring devices is substantially uniformly distributed.

A detecting device 50 is provided in order to be able to reliably identify when the rechargeable battery pack 20 has reached a critical stack height b, that is to say when the pouch cells 21, 22, 23, 24 together exhibit a change in size in the main direction HR of greater than a defined threshold value. The detecting device 50 has a sensor 51 which is arranged on the further wall 13, here in a recess 16 of the further wall 13, and a detecting element 52 which is arranged on the plate-like element 15. The sensor 51 is arranged in a central region of the further wall 13 and the detecting element 52 is arranged in a central region of the plate-like element 15. The sensor 51 and the detecting element 52 are arranged in relation to one another in such a way that the detecting element 52 comes into contact with the sensor 51 when the plate-like element 15 is displaced in the main direction HR by greater than a defined value owing to a corresponding increase in size of the rechargeable battery pack 20 and the individual pouch cells 21, 22, 23, 24 in the main direction HR, and a distance between the detecting element 52 and the sensor 51, at which the sensor 51 detects the detector element 52, is equal to zero in the present case. In this case, displacement of the plate-like element 15 in the direction of the further wall 13 occurs when a total internal pressure which is present in the pouch cells 21, 22, 23, 24 is greater than the force which is exerted on the plate-like element 15 by the spring devices 40, 41, 42, 43.

In the present case, the sensor 51 is designed as a contact sensor, so that contact between the detecting element 52, which here protrudes as from the plate-like element 15 in the direction of the further wall 13 and is designed as a detecting tip, and the sensor 51 can be detected by means of the sensor 51. In this case, the sensor 51 can be designed, for example, with a material which changes resistance when contact is made with it or pressure is applied to it by the detecting element 52. A change in resistance of this kind can be identified, for example, directly or by means of a voltage divider circuit and contact between the detecting element 52 and the sensor 51 can be ascertained. To this end, the sensor 51 can be designed with a film which contains a material of this kind.

Contact between the detecting element 52 and the sensor 51 can be immediately and reversibly detected here, wherein, for example, a control device initially prevents further operation of the rechargeable battery pack 20 when contact between the detecting element 52 and the sensor 51 lasts for longer than a prespecified defined time period.

Figure 4:
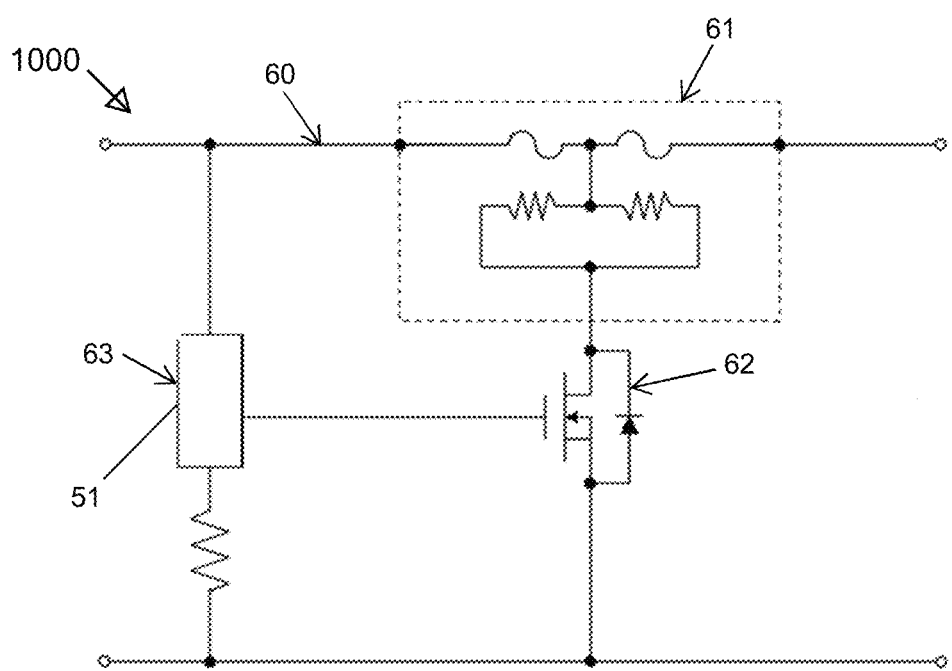
FIG. 4 shows a simplified circuit diagram of an electrical circuit in which a detecting device of the rechargeable battery pack apparatus is incorporated.

FIG. 4 schematically shows a detail of an electrical circuit 60 in which the rechargeable battery pack 20 is incorporated. The electrical circuit 60 is designed with a disconnection device 61 of the control device 1000, a switch device 62 which is designed as an FET, and a sensor device 63 which has the sensor 51. When the detecting element 52 is detected by the sensor 51, a voltage across an output of the sensor device 63 increases, the switch device 62 is actuated by said voltage and a current flows in the direction of the disconnection device 61. The current flows through a heating element of the disconnection device 61 and a fusible link of the disconnection device 61 melts, so that further operation of the rechargeable battery pack 20 is reliably prevented by mechanical isolation of the electrical circuit 60.

LIST OF REFERENCE SIGNS

1 Rechargeable battery pack apparatus
10 Housing device
11 Interior space
12 Wall
13 Further wall
14 Additional wall
15 Plate-like element
16 Recess of the further wall
20 Rechargeable battery pack (new)
20' Rechargeable battery pack (expanded)
21, 22, 23, 24 Pouch cell (new)
21', 22', 23', 24' Pouch cell (expanded)
26, 27, 28, 29 Contact lug
40, 41, 42, 43 Spring device; helical spring
50 Detecting device
51 Sensor
52 Detecting element
60 Electrical circuit
61 Disconnection device
62 Switch device
63 Sensor device
a, b Stack height
HR Main direction

What is claimed is:

1. A rechargeable battery pack apparatus for an electric handheld power tool, the rechargeable battery pack apparatus comprising:
   a housing device; and
   a rechargeable battery pack having at least one pouch cell;
   a detecting device having a detecting element coupled to the rechargeable battery pack and having a sensor fixed with respect to the housing, the sensor designed for detecting the detecting element when a distance between the detecting element and the sensor is below a defined distance; and
   at least one spring device applying a force to the detecting element, the force pushing the detecting element in a direction facing away from the sensor.

2. The rechargeable battery pack apparatus as recited in claim 1 wherein the detecting device is arranged on a plate bearing against the rechargeable battery pack and is displaceable in relation to the housing device and, with a wall of the housing device, delimits a space having the at least one pouch cell.

3. The rechargeable battery pack apparatus as recited in claim 1 wherein the sensor is designed for detecting the detecting element via contact.

4. The rechargeable battery pack apparatus as recited in claim 3 wherein the sensor is formed with a material which changes resistance via the contact.

5. The rechargeable battery pack apparatus as recited in claim 1 wherein the sensor is arranged on a further wall of the housing device.

6. The rechargeable battery pack apparatus as recited in claim 5 wherein the sensor is arranged at least in regions in a recess of the further wall.

7. The rechargeable battery pack apparatus as recited in claim 1 wherein the at least one spring device includes a helical spring or a plate spring.

8. The rechargeable battery pack apparatus as recited in claim 1 wherein the at least one pouch cell is arranged at least in regions within a space delimited by the housing device.

9. The rechargeable battery pack apparatus as recited in claim 1 further comprising a control device, the rechargeable battery pack actuatable via the control device, the detecting device being operatively connected to the control device.

10. The rechargeable battery pack apparatus as recited in claim 1 further comprising a disconnection device, the disconnection device being part of an electrical circuit actuating the rechargeable battery pack, the disconnection device being designed for mechanically interrupting the electrical circuit when the detecting element is detected by the sensor.

11. A method for operating the rechargeable battery pack apparatus recited in claim 1, the method comprising:
   decommissioning the rechargeable battery pack when the distance between the detecting element and the sensor is smaller than the defined distance over a defined period of time.

12. The rechargeable battery pack apparatus as recited in claim 1 wherein the at least one spring device includes four spring devices.

13. The rechargeable battery pack apparatus as recited in claim 2 wherein the at least one spring device includes four spring devices arranged between the further wall and the plate.

14. The rechargeable battery pack apparatus as recited in claim 13 wherein the four spring devices are arranged respectively at four corner regions of the plate.

15. The rechargeable battery pack apparatus as recited in claim 14 wherein the detecting element is located a central region of the plate.

* * * * *